INVENTOR
PETER P. SEMIENKO
EMIL TOLEDO
BY John J. McCormick
ATTORNEY

Dec. 22, 1970 P. P. SEMIENKO ET AL 3,549,507

METHOD OF FABRICATING A PLATED WIRE FERROMAGNETIC MEMORY ELEMENT

Filed Aug. 9, 1967 4 Sheets-Sheet 3

Dec. 22, 1970 P. P. SEMIENKO ET AL 3,549,507

METHOD OF FABRICATING A PLATED WIRE FERROMAGNETIC MEMORY ELEMENT

Filed Aug. 9, 1967 4 Sheets-Sheet 4

United States Patent Office 3,549,507

Patented Dec. 22, 1970

3,549,507

METHOD OF FABRICATING A PLATED WIRE FERROMAGNETIC MEMORY ELEMENT

Peter P. Semienko, Boston, and Emil Toledo, Natick, Mass., assignors to Honeywell, Inc., Minneapolis, Minn., a corporation of Delaware Continuation-in-part of application Ser. No. 518,184, Jan. 3, 1966, now Patent No. 3,506,546. This application Aug. 9, 1967, Ser. No. 659,388

Int. Cl. C23b 5/18, 5/50, 5/58

U.S. Cl. 204—28 11 Claims

ABSTRACT OF THE DISCLOSURE

Apparatus for electroplating copper films of precise uniform surface roughness, such as onto a wire substrate at very high speeds and continuously, plus associated copper electrolytes and plating methods. The intended roughness will provide uniformly distributed spherules about 1 micron in diameter and will provide a very precise control over magnetic properties of thin superfilms (over-coatings), such as about 1 micron of Permalloy plated onto the copper. Essentially, a hollow cylinder is provided as a copper-plating cell through which the wire may be advanced and along which recirculated electrolyte may be directed. Recirculation inlets are provided to communicate with the central passage and arranged to uniformly ionize the fluid electrolyte and to inject it into the passage so as to be distributed uniformly about the passing wire substrate. As a result, the electrolyte will be directly symmetrically and radially against the wire, as well as past it, and thus provide symmetrical, highly uniform agitation along the wire during plating. Novel associated electroplating methods and electrolytes (such as copper cyanide, copper fluoborate and copper sulfate) are also described. The object is to plate copper very quickly, yet uniformly, onto the wire to provide controlled surface roughness to act as a substrate for subsequent plating of thin magnetic memory films or the like.

This application is a continuation-in-part of U.S. application Ser. No. 518,184 filed Jan. 3, 1966, and now Pat. No. 3,506,546.

PROBLEMS, INVENTION FEATURES

The invention embodiment particularly relates to a distinctive plated magnetic (thin-film) memory configuration and to a novel associated plating arrangement for electroplating a roughened substrate surface for such a film onto a cylindrical body, as well as associated fabrication methods. More particularly, it relates to a "spherular" memory film and to a plating arrangement providing means for plating a copper substrate film so as to provide this "spherular" configuration, including a copper plating cell with electrolyte dispersing means and associated charging means for more uniformly distributing electrolyte adjacent a cylindrical substrate and thereby improving the speed and uniformity of plating such a copper surface.

Workers in the art of plating thin magnetic films onto wire substrate have commonly specified that the plating substrate should be as smooth as possible, an ultra-smooth "mirror" finish being common. It is commonly asserted that for control of magnetic properties, such as coercivity, roughness must be kept below some maximum, above which the proper characteristics would not be obtained. However, we have found, surprisingly, that such "mirror" finishes can be undesirable, at times, disastrous; and that such general "maximum roughness" specifications can be entirely useless—at least for depositing certain sensitive thin magnetic Permalloy films, or their like, such as for plated wire memory applications. We have found that by eliminating such "mirror" finishes and, instead, depositing magnetic films onto a substrate made to have a prescribed "spherular" surface, (i.e. having hemispheroidal protrusions of uniform diameter and within a certain narrow diameter range), a thin film can be provided which has surprisingly superior magnetic characteristics, such as are required in a thin plated "Permalloy" film, of the type used for "DRO" or "NDRO" mode wire-memory arrays. An exemplary such memory film is characterized below in Table I, though workers in the art will recognize equivalents:

TABLE I

Wire Substrate: 4.5 mil (diam.) Be-Cu wire having Cu film from 5 to 10 microns thick, electroplated to exhibit surface "spherules" having a uniform diameter of about 1–10 microns (above 0.1, below 20—represented in FIGS. 7–10) and low stress (max. about 20 Th.p.s.i.).

Magnetic Film: Permalloy (80.5 Ni–19.5 Fe) film about 1 micron thick.

Storage Properties:

Generally—Homogeneous; high output; low sensitivity (to such "disturbances" as: high digit current history effect, creep, adjacent bits interference, etc.)

Specifically—Min. write current: 12 ma.; Min. sig. output 5 mv. (under "test" worse pulse pattern).

Ratio No. 1:

$$\frac{\text{Maximum digit disturb current}}{\text{Minimum digit write current}} \geq 1.5$$

Ratio No. 2:

$$\frac{\text{Maximum Adjacent word current}}{\text{Minimum word write current}} \geq 1.4$$

Control over plating uniformity is typically important to workers in this art, and is critically important to workers plating substrate surfaces on which thin magnetic films will be deposited. Here, any departures from a prescribed uniform plating rate can radically change the magnetic properties of the super-film; for instance, if the crystalline structure of the substrate surface is varied, or if stresses are introduced or grain size is changed. Any such departure can be fatal to deriving the sought magnetic properties, such as "minimal magnetostriction". Thus, it is an object of the invention to provide a technique and associated means for providing the aforementioned "spherular" surface. A related object is to improve the uniformity of plating such a metallic surface onto cylindrical substrates, even when the substrate comprises a continually moving filament, such as a copper alloy wire. An associated object is to provide means for dispersing the plating electrolyte in a prescribed manner and distributing it symmetrically and radially inward upon such substrates as they move through a plating cell. A related object is to provide means for creating a homogeneous distribution of charged ions in such an electrolyte. Still another object is to provide a novel electrolyte and associated plating conditions apt for employment in providing such spherular surfacing; and particularly to be used with such distribution means, especially under high current density, "fast-plating" conditions.

It will be evident to those skilled in the art that non-uniform plating can also degrade a plated deposit (e.g. of copper) by introducing uncontrolled (random) roughness and surface discontinuities therein. It is axiomatic in the plating art that surface roughening is a relatively irreversible process; that is, as a deposit proceeds to build up, it can never be smoother than either the substrate it initially encounters or that created during build-up (except where special leveling treatments are invoked). Thus, in electroplating copper onto a moving filament, any discontinuity in the plating rate along the length of the plating cell will create random roughnes discontinuities which thereafter will further build up at the same or greater roughness (e.g. when a magnetic superfilm is deposited). Hence, for such a case, workers in the art appreciate that for controlling plating smoothness, it is important to maintain a uniform plating rate along the active length of a plating cell while a substrate is moving therethrough. The present invention provides a critical roughness specification uniquely apt for such films and, particularly, specifies a novel cell structure and associated electrolytes adapted for such uniform plating. It additionally provides a unique control over plated roughness. Workers in the art well know that controlling plated roughness (e.g. so as to be better defined, more homogeneously distributed and thus provide a "spherular" surface) is something much desired and long awaited.

Thus, another general object of the invention is to provide a carefully controlled substrate surface for depositing magnetic thin films or the like. A more particular object is to provide such a substrate having a prescribed "spherular surface," otherwise characterized as having a "caviar" appearance at about 400× magnification. Yet a more particular object is to provide a wire substrate for such films which is copper-plated so as to yield such a "caviar" surface, having "spherules" uniformly distributed thereon, these spherules having a uniform diameter on the order of approximately one micron magnitude. A more particular object is to specify the electrolyte, plating cell and plating conditions apt for so plating such spherular surfaces.

The foregoing and related objects and features of novelty which characterize the invention are pointed out with particularity in the claims annexed hereto and forming a part of the present specification. For a better understanding of the invention, its advantages and specific objects attained with its use, reference should be had to the explanations associated with the accompanying drawings in which there are illustrated and described preferred embodiments of the invention.

In the drawings, wherein like reference numerals denote like parts:

SPHERULAR SURFACE

Figure 3:
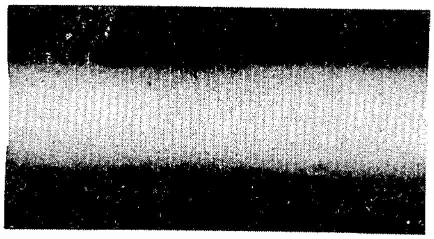
FIGS. 3–11 are copies of photographs, taken at 400× magnification, of exemplary plated wire surfaces, some falling within the definition of a "caviar" (spherular) surface; some not.

We were confronted with the problem of plating a thin magnetic film for wire memory applications (see typical definition in Table I); that is, generally speaking, plating a film to have high output (at low write-currents) and good disturb resistance (in the presence of normal defects). In selecting a suitable substrate, we naturally turned, at first, to wire having the common "mirror" finish. It has been commonly accepted in the art that a very smooth substrate surface is the best for satisfying plated wire memory requirements. We found that when such a smooth substrate was plated with a thin magnetic film (such as indicated in Example I, below; see also the plated surface shown in FIG. 3), it could be satisfactorily "written on" with about 5 ma. (write-curent), but the bits were commonly destroyed, evidently by creep and strong adjacent bit interference.

It will be noted that, using memory films, a prescribed separation distance between adjacent word lines is required to prevent undesirable interference and possible destruction of the stored information. Often, this separation must be at least about 100 mils center-to-center (e.g. on smooth wire). It will be remembered by those skilled in the art that one of the problems in designing and fabricating a plated wire memory is reducing bit-length and minimizing bit-to-bit spacing. However, adjacent magnetostatic effects place specific limitations on such reductions. When the width of a word line is decreased, a proportionately larger applied field is required to rotate magnetization under the center of a strap and this is apt to become larger than the anisotropy field. This is because the induced magnetic poles create a de-magnetizing field which increases as the width of the word line decreases and, therefore, as the distance between magnetic poles decreases. Hence, as the bit-spacing on a plated wire segment is decreased, the magnetic interaction between adjacent bits becomes more significant until they are, eventually, destroyed.

Figure 4:
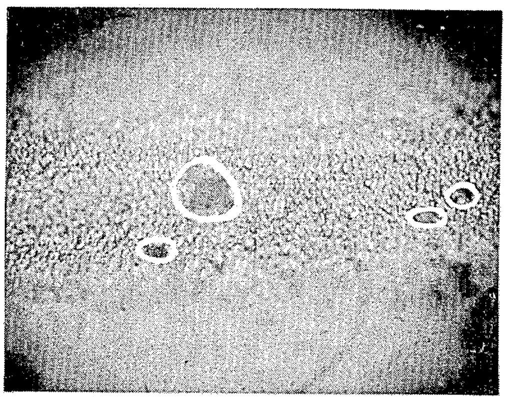

When attention was turned to a rougher surfaced wire, such as the "spherular" surface indicated in the photomicrograph showing of FIG. 4 (having substrate spherule diameters in the neighborhood of 0.1 to 0.5 micron), the thin magnetic film was still found to be less than wholly satisfactory; that is it had a fairly high output, but was excessively defect-sensitive and disturb-sensitive. It was later theorized, however, that although the spherules here appear too fine for high yield wire with satisfactory performance, in certain marginal cases such a surface might be satisfactory if certain defects (such as circled defects D–4 indicated in FIG. 4) could be eliminated. Defects D–4 may be characterized as pin-holes and are the result either of unsatisfactory electropolishing of raw wire or of surface contamination (before Permalloy plating). Thus, it was found less than desirable for a (plated) wire surface to have too fine a grain structure (too smooth). For instance, wire having surface spherules less than about 0.3 to 0.5 micron (diameter) were overly disturb-sensitive, as well as creep-sensitives "defect-prone" or intolerant of defects (i.e. exhibiting too many "drop-outs"—the slightest surface imperfection causing local signal-reduction).

Figure 5:
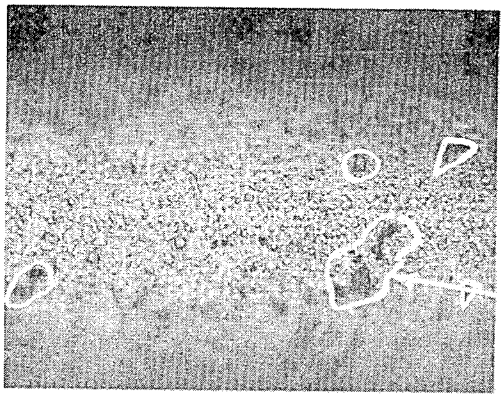
Figure 6:
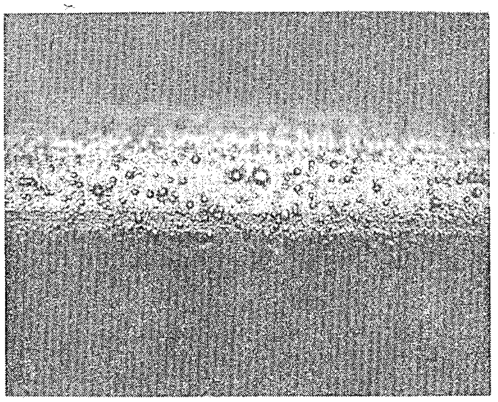
Figure 7:
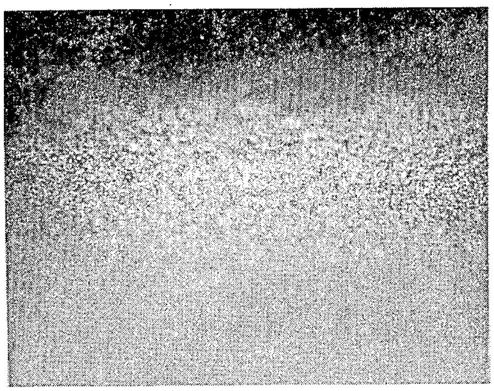
Figure 8:
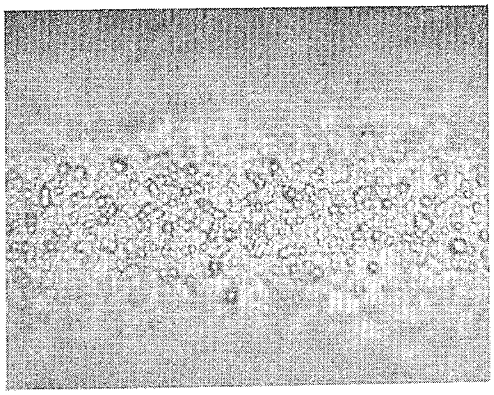
Figure 9:
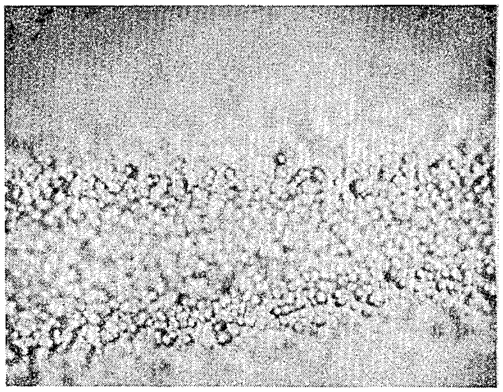
Figure 10A:
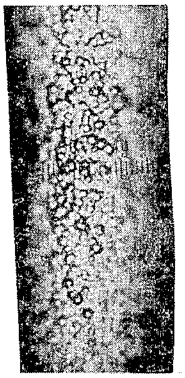
Figure 10B:
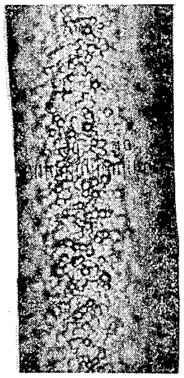
Figure 10C:
Figure 10D:
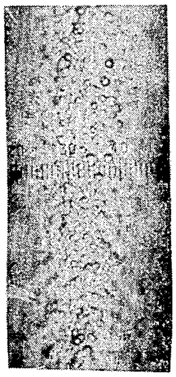

When attention was turned to rendering wire substrates having larger diameter spherules, it appeared that these will nonetheless be unsatisfactory unless they are distributed over the surface with sufficient uniformity. For instance, substrates having surface characteristics like those in FIGS. 5 and 6 where the spherule-diameters are not particularly uniform and where there are many defects, the plated magnetic film would still not satisfy the stated specifications. These defects (D–5, D–6—circled in FIG. 5) comprise unplated areas caused by surface contamination. Thus, a surface having spherules of the proper diameter but unevenly distributed will accordingly have variances in their magnetic properties, such as readout "voids," and are also likely to have disturb-sensitivity and inadequate read/write response. For instance, a substrate such as that shown in FIG. 5, having a "non-uniform" surface roughness (not very homogeneous) is observed to require too high a wire-current (about 32 ma.) and have low read-out. Similarly, magnetic films over a surface like that shown in FIG. 6 have also been observed to be unable to write adequately at 12 ma. and, additionally, to be very disturb-sensitive.

Figure 11:
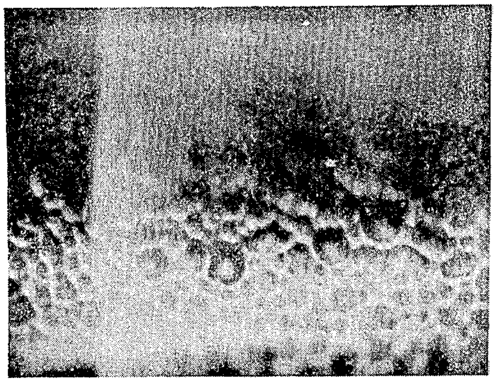

At this point it might appear that rendering a substrate surface with an even distribution of uniform-diameter spherules should provide satisfactory magnetic properties as long as the spherules were large enough. However, this was found not to be the case, since too large a spherule diameter, though usually providing good-disturb-resistance, would not give adequate output voltage. Thus, it appeared that the finer (smaller) the spherule diameter, the higher was the undisturbed output; while the lower was the resistance to "disturb fields," creep, etc. For instance, wire having a plated surface as indicated in FIG. 11, where the spherules were "fairly" homogeneous, but had a large diameter, about 20 microns, while exhibiting good disturb-resistance, proved unable to write satisfactorily at 12 ma. and gave too small a read-out voltage.

Consequently, it began to appear that achieving the proper magnetic characteristics depended upon maintaining a spherule characteristic uniformly distributed over the wire substrate, plus keeping this spherule diameter uniform and within a certain range, i.e. more than a prescribed minimum and less than a prescribed maximum diameter. Thus, it was found, according to the invention, that plated wire substrates of the type described and having a "caviar" appearance (at 400× magnification) would uniquely derive the desired magnetic film characteristics. Such a surface presents a continuous, uniform granular appearance representing the compact conglomerate of Permalloy crystalites formed into well-defined grains (spherules) uniformly distributed over the entire cylindrical wire surface. The shape of these grains is close to hemispherical and the average grain diameter will be in the range of from about 1 micron to about 4 microns, these spherular grains being smooth along the sides and the top, being relatively contiguous, and being homogeneous in size and conformation. (See the exemplary surfaces in FIGS. 7 through 10, all giving good performance.) Defects in the form of holes, dye-marks and plating imperfections, such as pits or blisters, may appear irregularly. However, good quality wire must have the aforedescribed spherular characteristics and "caviar appearance" and be free from the aforementioned "surface defects." In the optimum case, "surface defects" (i.e. anomalies from this standard) should not total more than about 100 mils square per linear inch, and the maximum length of any single defect should not be over 2.5 mils along the wire axis not over 12 mils square nor be any closer to any other defect than about 40 mils.

Restated, this means that the surface must not be "mirror" smooth, but somewhat rough, and uniformly rough, with spherules having relatively uniform diameters in excess of about 0.1 micron (for the stated magnetic specifications) to provide sufficient resistance to disturbance, creep and the like (and so as not to be too "defect-prone"). Conversely, the surface must not be too non-uniform, nor the spherules too large, being something less than about 20 microns so as to give sufficient voltage-output (and write-current sensitivity.) For instance, it was found that a spherule diameter of about 0.3 micron presented a somewhat "marginal" case for these specifications. It appeared to provide a good, or at least marginal, performance, except that yield etc. dropped badly where many drop-outs occurred (since these finer-diameter spherules are evidently defect-sensitive, the slightest surface imperfection seriously affecting signal read-out).

As a summary of the aforementioned discussion, and as a tabulation of the "good" and "bad" surface characteristics shown in FIGS. 3–11, one may consult Table II as follows:

TABLE II

[Surface characteristics shown in figures 3–11]

| Figure | Appearance (at 400 ×) | Typical spherule diam. (microns) | Satisfactory Performance? |
|---|---|---|---|
| 3 | "Mirror" finish (too smooth) | None | No. |
| 4 | Pin-hole type defects | 0.1–0.5 | Do. |
| 5 | Non-uniform, plus many defects (pin-holes) | About 0.7 | Do. |
| 6 | Non-uniform | About 0.5 to 2.5 | Do. |
| 7 | "Fine caviar" | About 1.0–1.5 | Yes. |
| 8 | "Medium caviar" | About 1.5–2.0 | Do. |
| 9 | "Medium caviar" | About 2.0–2.5 | Do. |
| 10 | "Coarse caviar" | About 3–4 | Do. |
| 11 | "Too coarse" | About 10 (some larger) | No. |

Although other embodiments will occur to those skilled in the art, for purposes of evaluating and comparing the foregoing results, it should be assumed that the embodiment of magnetic films in question were electroplated onto a substrate having characteristics like those (exemplary) characteristics detailed and summarized in Table III below, as follows:

TABLE III (5-mil Be-Cu wire after elec-polish, Cu-plate and final elec-polish)

Mechanical:

- Tensile str. of wire: $165\times10^3$ p.s.i.;
- Min. hardness of wire: RC#32;
- Max. elongation of wire: 5%;
- Straightness: ½ in. radius (max.) per foot;
- Wire diameter (mils): of Be-Cu core 4.5 (± .3); plus Cu-plate 4.8 (± .3); as polished, and (Ni-Fe) plate 4.9 (± .3);
  - Max. plating micro-stress: 20,000 p.s.i.

Composition: Be-Cu core: plated with 99.9% (min.) electrolyte copper; (Max. phosphorous content about 0.05%).

The aforementioned "caviar" (spherular) surface characteristics, especially those such as are represented in FIGS. 7–10 and found satisfactory for the aforedescribed magnetic specifications, are detailed in tabular fashion in Table IV, as follows:

TABLE IV—EXEMPLARY "CAVIAR" SURFACE (Surface specification—12 in. samplings @ 400× magnif.)

Generally: Having copper-plated substrate to (average thickness) 3(±1) micron to yield the "caviar" surface appearance at 400× magnification, i.e. having uniform distribution of smooth, closely adjacent "spherules" of uniform diameter of approx. 1–4 microns (except for those induced by substrate defects).

Surface defects: none may be induced by plating, polishing, etc.

Micro-variances in diameter: (cf. dye markings): Max. avg. (peak-valley) depth: 0.04 mil (max. avg: 0.02 mil).

Surface anomalies: (pits, holes, blisters): Max. defective area is: 12□ mil per linear inch of wire for defects up to 2.5 mils long and up to 1 mil deep. Max. length: 2.5 mil; Max. depth: 1 mil; Max. area: 5□ mil and spaced at least 40 mil from any other defect.

No Corrosion or Oxidation: (on Cu-plate surface before or after polishing).

These characteristics were found critical, i.e. it was found that plated wire with non-homogeneous roughness, with too much "defect-area," or with spherules that were too large was entirely unsatisfactory and unable to meet the magnetic specifications.

Workers in the art will appreciate learning preferred methods for rendering such a "caviar" surface. We have found certain preferred electrolytes, plating conditions and plating cell structure which is highly satisfactory for this and will now describe them. In general, it will be understood that the preferred copper plating electrolyte will have a high free cyanide concentration (this may be used for control purposes conveniently), as detailed in the aforementioned co-pending application and that the plating conditions will generally include a very high current density along with high agitation so that no significant depletion effects occur (preferably by using the below-described novel plating cell). We have also found that the indicated pre-copper-plating polish and a post-copper-plating polish of a specific type are very desirable, the latter evidently helping to round off and smooth the surfaces of the plated spherules. In particular, it will be noted below that we have found certain electro-polishing solutions, such as ortho-phosphoric acid (alone or diluted—and in some cases including about 2% sulfamic acid), which provide a very satisfactory post-polishing and which can polish rapidly at an unexpectedly low current density (that is, the product of the current density and the polishing time is unexpectedly low).

PLATING TECHNIQUES

The invention is also intended to teach improved faster methods for electroplating such "caviar"-surfaced copper coatings. Propaedeutic methods will now be described for plating such coatings onto a moving wire substrate in relatively thick layers with good control over the critical surface roughness. Such a substrate may comprise any metal wire, such as beryllium-copper drawn wire or the like. This substrate should have a reasonably smooth surface within the limits expected on the plated copper film.

Accordingly, it will be explained how a standard wire substrate may be advanced continually through a novel electroplating cell. Such a cell is described below as to the particular embodiment indicated in FIGS. 1 and 2, but may generally be understood as being hollow for admitting the wire along its longitudinal axis and including a plurality of recirculation fluid inlets disposed relatively uniformly along its length thereof so as to direct the flow of plating fluid against the wire within. A plurality of fluid-diversion means are provided within the cell to coaxially surround the wire, each communicating with an associated one of the inlets to divert the fluid therefrom in a prescribed helical direction (mode) for impelling the charged electrolyte against wire substrate to pass contactingly therealong, thus maintaining the composition of electrolyte adjacent the filament uniform and "undepleted." The fluid-diversion means are preferably perforated to allow escape of hydrogen bubbles from adjacent the wire.

We will also explain how certain preferred copper plating electrolytes have been developed for use with this cell, such as will be operable at the typical, extremely high current densities for providing the "caviar" surface at fast, highly efficient plating rates, yet with uniformity and smoothness. One such electrolyte comprises a copper cyanide bath, such as is indicated in Table V, operating at prescribed ranges of bath temperature and cyanide and copper concentrations. As seen below this "cyanide" electrolyte provides the advantages of close control over plated surface roughness (see "dual control" feature below) although where this control is not specifically necessary, a novel fluoborate electrolyte may be used (as noted below), the latter electroplating smooth films with surprising speed. Of course, the described plating cell and associated methods will also be advantageous (though to a less degree) with virtually any other known copper plating electrolyte (such as commonly known sulfate, ammonium sulfate, pyrophosphate baths and the like).

Referring now particularly to the preferred plating electrolyte and associated plating method of Table V, we will now describe the plating of "caviar-surfaced" copper onto a typical filamentary substrate, namely a beryllium-copper wire of about 5 to 8 mils diameter and having a prescribed uniform shape, smoothness and freedom from discontinuities. Such a wire may be immersed in an acid electrolyte to be "electrolytically drawn" (reduced) to a prescribed uniform diameter and smoothness, for instance, as described in a co-pending commonly assigned U.S. patent application to P. Semienko and E. Toledo, Ser. No. 518,013, entitled "Metal Treatment." The wire, being thus normalized in diameter and surface finish, with a uniform smoothness and absence of discontinuities, is then continually advanced through a series of treatment stations, such as by drawing the wire from a spool continuously at about 12 inches per minute. The wire may first be advanced through a clean water rinse and thence to a cathodic neutralization station. The neutralization is provided, first to neutralize any acidic residues on the wire, and, second, to clean the wire surface for subsequent copper plating. The neutralization bath thus comprises a basic aqueous cleaner which will not attach the (copper alloy) wire and preferably includes an aqueous mixture in the proportions of: 23 grams sodium carbonate, 23 grams sodium phosphite tribasic and 46 grams sodium meta-silicate in about one liter of water (or similar proportions). This bath is kept at room temperature and used with a cylindrical lead anode, presenting a relatively uniform cleaning current of about 20 ma./cm.$^2$, as known in the art.

PREFERRED PLATING CONDITIONS

After cleaning, the wire is advanced through a clean water rinse and thence through a copper electroplating station (preferably including the cell of FIGS. 1, 2 . . . see below). A very substantial layer of copper is here deposited very quickly and very smoothly according to the invention, both to improve the "plate-ability" of the metal filament substrate and to improve its magnetic characteristics. Typically, this thick copper layer may be as thick as about ¼ to ½ mil where surface roughness must be carefully controlled (Example I); otherwise, up to about one mil (e.g. with fluoborate bath).

This technique of "rebuilding" a wire substrate by depositing a substantial layer of copper thereon may be implemented in various ways, as workers in the art will see; but after investigating a number of copper plating baths, we found most satisfactory to be the aqueous cyanide bath having the constituents indicated in the examples of Table V below. Of course, these examples, and others below, are intended to more fully illustrate the invention and how a particular substrate may be rendered and the invention should not be taken as limited to the specific substrates, electrolytes, and plating conditions described, but rather to include all equivalents evident to those skilled in the art and within the scope of the claims.

TABLE V

| | Example I (preferred) | Variant examples (ranges) |
|---|---|---|
| Copper cyanide | 60 gm. (to proper Cu conc.) | |
| Sodium cyanide | 90 gm. (to adjust free cyanide conc. to: 17 (±2) gm./l.) | And/or potassium cyanide 5–40 (pref. 15–25) gm./l. |
| Sodium carbonate | 30 gm. | Vary ± 25% (pref.). |
| Sodium hydroxide | 20 gm. (Min. 10 gm./l.) | |
| Water | 1 liter | |
| Concentration of copper (at 17 gm./l. free cyanide). | 40 (±5) gm./l. | Approx. 30–55 gm./l. |
| Test specific gravity | 1.11–1.14 | 1.11–1.14. |
| pH | 13 or over | 13 or over. |
| Bath temperature | 55° C. (approx.) | 40°–60° C. |
| Typical current densities | About 50–600 ma./cm.$^2$ | |
| Agitation | Extremely high rate: helical mode | |
| Cell structure | Double anodes, inlets and diverters | |
| Typical plating thicknesses (about 1.3 min. total immersion time). | From about 1 micron at 50 ma./cm.$^2$ to about 6 microns at 400 ma./cm.$^2$. | |

NOTE.—Maximum smooth plated thickness: order of 6 microns/min., though can vary widely.

Figures 1, 2:
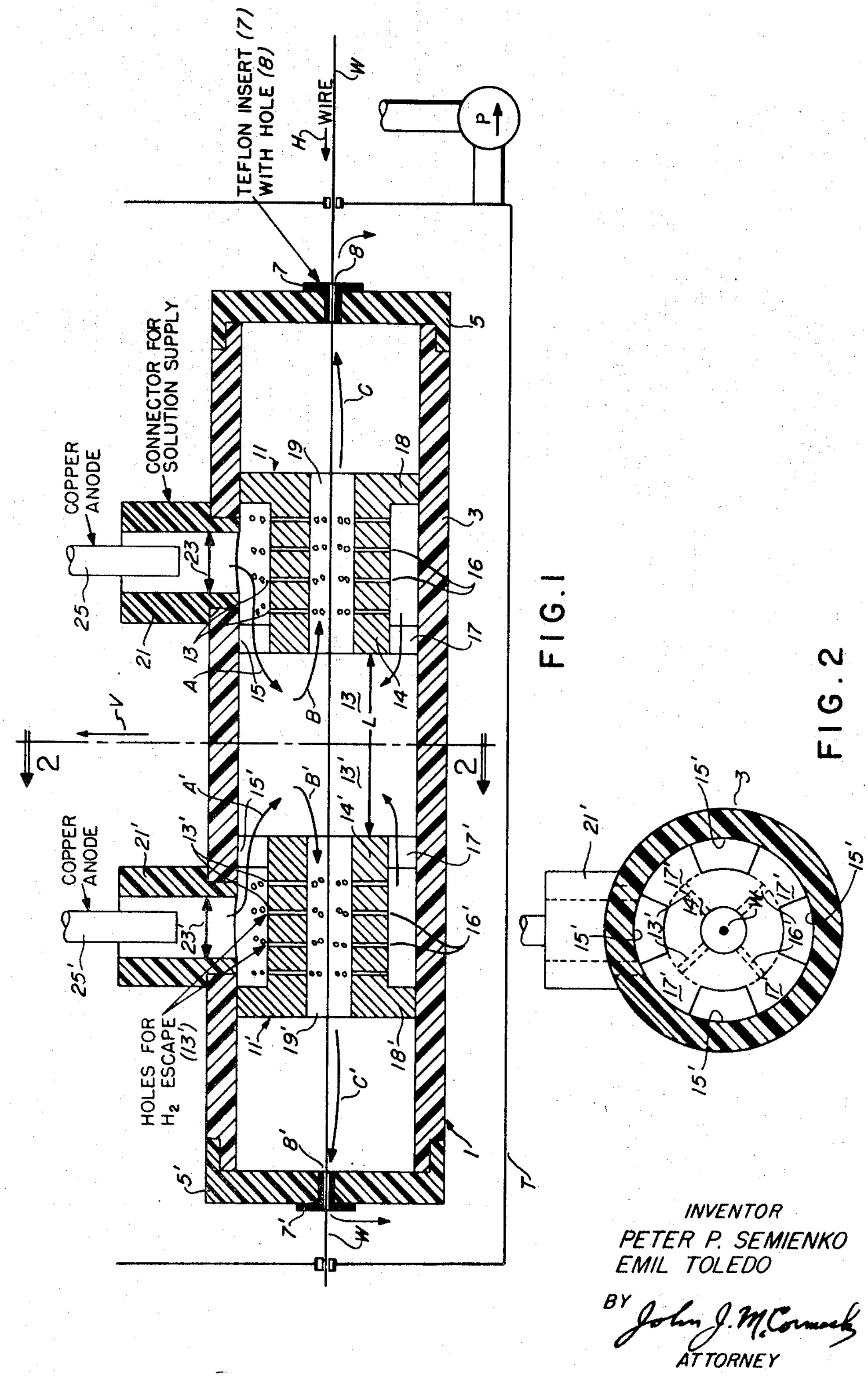
FIG. 1 shows a side-sectional schematic view of a preferred copper-plating cell arrangement for plating "caviar-surfaced" copper coatings, according to the invention.
FIG. 2 is a sectional, end view of the cell in FIG. 1, taken along lines 2—2.

Table V indicates preferred conditions for plating the aforementioned "caviar"-surfaced copper coating and, employing the indicated ingredients and conditions, preferably uses a plating cell like that of FIGS. 1 and 2, being about eight inches long and including highly active agitation means and associated ionizing means etc. for assuring homogeneous charge density and bath composition throughout, especially adjacent the wire. The free cyanide concentration should be kept near the indicated level since an increase tends to degrade plating efficiency, though it gives a finer-grain surface. Large increases can even be noxious. For example, a concentration of less than 10 grams derived a much coarser coating than the indicated 17 gram concentration, while 40 grams was too inefficient to plate a sufficiently thick layer. (Efficiency is proportional to plated thickness per minute at a certain current density.)

A feature of the invention is that smoothness may be controlled for constant plated thickness by simply adjusting cyanide concentration, and compensatorily, current density. Thus, one may increase cyanide concentration to get a smoother coating and, since this also tends to reduce plated thickness, may increase current density sufficient to compensate.

Shorter immersion times (e.g. resulting from increased wire-transport speed) can be compensated-for by decreasing free cyanide concentration and/or by increasing current density (CD). (This may also be done to increase surface roughness.) Thus, according to this feature of the invention, this novel cyanide electrolyte combination with the prescribed plating cell structure provides a "dual control", something that appears to be uniquely advantageous in the art, being characteristic of the cyanide-type (sodium or potassium) electrolytes. Workers in this art will quickly appreciate how advantageous such a "dual control" can be, such as in the common circumstance where one wishes to increase wire transport speed, yet still maintain a constant plated thickness and micro-structure. For instance, in a plating environment like that of Example I, suppose one is plating three to four microns onto a wire moving at about 4 inches per minute, using about 200 ma. CD and about 17 gm./l. free cyanide concentration. If you wanted to increase the wire speed to about 9.6 inches per minute without upsetting the plated structure, this "dual control" feature allows you to do so, simply by decreasing the cyanide concentration to about 12 (as a rough control) and, (as a fine control), then adjusting CD (e.g. to about 225 ma. or until the micro-structure and magnetic properties, etc. appear the same as before). Either sodium cyanide, potassium cyanide, using modified operating conditions with the latter, or a combination of the two, may be used as a source of cyanide. As to the concentration of copper, concentrations substantially lower than that indicated (for instance, 26 grams per liter), will produce a dull, large-grained finish, whereas concentrations substantially higher (for example at 58 grams per liter) will yield a very rough, uneven surface. The range of specific gravity provides a handy check as to proper concentration of copper. As to bath temperature, 55° C. gives good results, while below the indicated range (for instance, at 30 degrees), a rough grain is derived; whereas substantially above it (such as at 80° C.), the bath tends to become unstable and may present a health hazard because of the evolution of cyanide fumes. Various equivalent baths, both acidic and basic, will occur to those skilled in the art; however, the following were found somewhat less satisfactory, namely baths consisting essentially: of copper sulfate; of Rochelle cyanide; of pyro phosphate; and of common commercial copper leveling solutions.

The aforementioned "fluoborate" bath is preferably comprised as follows:

EXAMPLE I–A (Range in parentheses)

Cupric fluoborate (Baker and Adamson #1643): 250 ml./l. (250–400); Cupric ammonium sulfate: 125 gm./l.

(25–over 1000); Boric acid: 30 gm./l. (not critical); Fluoboric acid: to adjust pH to 0.5 (0.1–1.0) with bath temperature about 50° C. (40°–60°) and current density from about 100–2000 ma./cm.$^2$ (acc. to thickness to be plated, structure desired, etc.). This electrolyte provides a unique combination of smooth plating at surprising speed; for instance, plating about 2 microns with an immersion time of about 1.3 min. and CD about 100 ma./cm.$^2$ (or, equivalently, 30 microns at 1500 ma./cm.$^2$) and can deposit as much as 1 mil/minute at about 16 amp/in.$^2$ (this being "polish-able" to a mirror surface about 0.8 mil thick). As aforesaid, however, this electrolyte does not provide the described fine control over grain size of the cyanide baths (using the aforementioned plating cell) and typically necessary for a "caviar" surface.

Using the copper plating cell indicated in FIG. 1 and under the plating conditions summarized in Example I, it is possible to plate at uniquely high current densities, as high as about 1250 amps/ft.$^2$ (600 ma./cm.$^2$) plating at about 3 microns per minute with good control over roughness (though not sufficient control to render a "caviar" surface), plating copper to about 10 microns diameter thickness on wire W, moving at 5 in./min. through the 8-inch cell of FIG. 1. By contrast, workers have been heretofore limited to a maximum of about 50 amps/ft.$^2$ and about one-half micron per minute in plating uniform copper substrate surfaces suitable for magnetic film deposition. This conventional plating rate is so slow that it has made it impractical to plate more than about one micron on wires which are advanced at the typical five inches per minute speed, since it is impractical to use plating cells longer than about ten inches. Further, the plated surface uniformity has not been reliably controllable even at this slow rate, where it is using the aforedescribed novel electrolytes and novel cell design.

Workers in the art will recognize that this precise control over uniformity of roughness is critical for certain applications, such as providing the "caviar" substrate for magnetic thin film deposition; and that it has been heretofore unavailable. It is surprising that the described electrolytes and plating cell have been able to achieve the indicated improvements in both control over roughness (degree and uniformity) and in placing efficiency because prior art plating this fast (high CD) and this thick have been unsatisfactory. By way of summarizing the efficiency of this plating technique, Table VI indicates current density (CD) as a function of the approximate thickness of plated copper, along with the uniform roughness derived. It is assumed that the bath conditions in Example I (or the equivalent) obtain here and that immersion time is approximately 1⅔ min.

TABLE VI

[Variation of plated thickness with current density in example I]

| CD (Ma./cm.$^2$) | Plated thickness (microns, radially) | Variations (± microns) | Finish |
|---|---|---|---|
| 2 | 0.1 | .05 | Very smooth. |
| 8 | 0.4 | .1 | Good-fair (uniform roughness). |
| 18 | 0.9 | .20 | Do. |
| 24 | 1.2 | .20 | Do. |
| 36 | 1.4 | .20 | Do. |
| 48 | 1.8 | .20 | Good (uniform roughness). |
| 200 | 3.5 | .50 | Optimum (uniform roughness). |
| 600 | 5.0 | 1.0 | Marginal (uniform roughness). |

PLATING CELL

FIGS. 1 and 2 indicate sectional side and end views, respectively, of an embodiment of a novel plating cell arrangement for plating copper, or any like material, to a substrate with improved uniformity and efficiency—especially a "caviar" surface. A copper plating cell 1 is mounted in a tank T adapted to be filled with the intended copper plating solution (such as that of Example I above). It will be understood that a plurality of such plating units (like cell 1 in Tank T) may be required where larger amounts of copper must be plated on the moving substrate (wire W), being preferred to a single long cell for reasons of geometry and the like. However, using one such cell about 8 inches long (about 7 in. "active" length; there being about 1.3 min. immersion time at 5"/min. speed) was sufficient to plate several microns of copper very quickly, yet with controlled uniform roughness, under the conditions of Example I. Tank T includes a recirculating line of a type known in the art and comprising a recirculating pump P and associated conduits for removing the plating solution from the bottom of Tank T at a prescribed rate and injecting it into an elevated reservoir (not shown) from which it may be gravity-returned to plating cell 1, as needed, through two or more similar reinjection/ionizing means spaced relatively equidistant along the cell length (see the pair of tabular top conduits 21, 21' and associated ionizing anodes 25, 25'). The cross-sectional areas of conduits 21, 21' (diameters 23, 23') should be similar to provide a uniform rate of fluid injection longitudinally along cell 1. These injection apertures together with the elevation level of the reservoir, etc. will, of course, determine the rate at which plating fluid is recirculated to cell 1. For the indicated arrangement, a conduit inner diameter 23, 23' of about ⅜" was found adequate.

Plating cell 1 generally comprises a cylindrical tubular body 3 of Plexiglas with conduits 21, 21' arrayed relatively equidistant along the top length thereof. It was found satisfactory in the indicated arrangement to employ a tube 3 about 7 inches long with an inner diameter of about ¾". The ends of tube 3 are capped by a pair of Plexiglas disc caps 5, 5', each having a bore centrally thereof which is adapted to receive a Teflon insert 7, 7', these inserts, in turn, each having a like central bore 8, 8', respectively, of sufficient diameter (e.g. 50 mils) to allow wire W (about 5 to 7 mils diameter) to be advanced continually therethrough, as indicated by the arrow, while leaving a prescribed clearance radially therearound. This clearance should be large enough to allow the escape of a prescribed amount of plating solution, but sufficiently small to keep the plating fluid at or near the top of the inside of tube 1. Secured within the bore of cylinder 3 are a pair of Plexiglas agitation-directing units, or shields, 11, 11'. Shields 11, 11' each comprise similar, relatively cylindrical, hollow, tubular bodies 14, 14' each having a solid flange portion 18, 18' extending outward at one end thereof to engage tube 3. Tubes 14, 14' also have central concentric bores 19, 19' respectively adapted to conduct plating fluid along wire W opposingly and a plurality of radially-extending flange-sectors 17, 17', respectively. As best indicated in FIG. 2, sectors 17, 17' are disposed relatively symmetrically about the circumference of tubes 14, 14', respectively, at one end thereof to engage the inside of cylinder 3 for positioning engagement therewith as with solid flanges 18, 18' at the opposite ends of tubes 14, 14'. Sectors 17 and 17' are spaced circumferentially from one another by fluid-conducting apertures 15 and 15', respectively, which are arranged, according to a feature of the invention to introduce the fluid from associated conduits (21, 21') into cell 1 adjacent wire W in a prescribed helical agitation mode. It has been found that locating three or more apertures 15, 15' relatively symmetrically about the circumference of tube 3 can impart a very desirable helical agitation of the introduced plating fluid about wire W, both in the inter-shield area L of cell 1 and therebeyond, along wire W, through bores 19, 19' and toward the outlets adjacent inserts 7 and 7' respectively. The total cross-sectional area of apertures 15 and apertures 15' must be similar and be as large as (preferably somewhat larger than) that of the associated conduits 21, 21' respectively. Thus, sectors 17, 17' will have a prescribed radial size sufficient to engage the inside of tube 3 and a prescribed circumferential width sufficient to leave apertures 15, 15' of the prescribed cross-sectional area. The cross-sectional area of bores 19, 19' through tubes 14, 14', respectively, is related to that of any of their associated supply passageways, namely passageways 21, 15 and 21', 15', respectively, being substantially smaller to increase the velocity of the fluid therealong. It was found that an area for bores 19, 19' of about one-third to one-quarter that of conduits 21, 21' gave satisfactory speed and agitation with the described arrangement.

Typical paths for the fluid through this helical agitation arrangement of shields 11, 11' are indicated by the arrows A, B, C and A', B', and C', respectively. For instance, arrow A indicates the entry of injected fluid from conduit 21, its subsequent distribution through apertures 15; and then its injection, in a helically agitating manner, into the inter-shield region L to be there rolled around. The fluid then is turned to enter bore 19, as arrow B indicates, following wire W therethrough in a helical, screw-like motion to emerge therefrom and, passing on (per arrow C), to exit through bore 8 in insert 7. (Similar with arrows A', B', C' for shield 11'). It will be understood by those skilled in the art that this form of agitation and equivalent forms may be provided by additions to, substitute for and modifications of the indicated structure. For instance, it may be advantageous to add turbine-like deflector vanes along the exterior of tubes 14, 14' to direct fluid shearingly and more efficiently through apertures 15, 15'. It will be appreciated by those skilled in the art that the continuous and well-determined agitation of the plating fluid provided by shields 11, 11' as indicated above, will assist in keeping the bath composition homogeneous throughout cell 1 (along wire W) and hence maintain the rate of copper deposition relatively uniform along the length of wire W within cell 1 especially along portions thereof within the shields and therebetween.

More particularly, it will be appreciated that this agitation being made helical or the like and thereby given components of motion in both the horizontal and vertical directions (arrows H, V, respectively), it will prevent the customary depletion layer from forming circumferentially about wire W. Workers in the art will appreciate the advantages of such an agitation arrangement for destroying this depletion layer and preventing it from interfering (as it commonly will) with the replenishment of plating fluid of the prescribed composite adjacent wire W. In effect, such agitation provides a homogeneous source-ion concentration adjacent wire W along its entire length and thus provides a uniform rate of deposition therealong. It will be recognized that a uniform deposition rate along wire W is critically important since non-uniformities can cause harmful discontinuities in deposited crystalline structure. Such agitation also prevents depletion from degrading plating efficiency, since the plating rate should desirably be a uniform maximum along the entire length of cell 1.

According to another feature of this novel cell arrangement, shields 11, 11' are provided with a plurality of radially-bored vent holes 13, 13' and 16, 16' distributed somewhat evenly along the length of the tubular portions 14, 14' thereof. The longitudinal distribution of holes 13, 16 will be appreciated from FIG. 1; whereas the circumferential distribution is best indicated in FIG. 2, the pair of upper holes being characterized at 13' and the lower holes as 16'. It will be appreciated that the exact number and location of these holes is variable within the contemplation of the invention. The purpose of holes 13, 16 etc. is to allow the escape of hydrogen gas bubbles from around wire W in the region of bores 19, 19', upwardly, through tubes 14, 14'. Thus, the number (density) of holes longitudinally along tubes 14, 14' should just be enough to dissipate substantially all the likely bubbles, while the number (density) circumferentially should be sufficient to assure that at least one row thereof will be positioned relatively above wire W no matter how the shield 11, 11' is fixed in tube 3, thus allowing random shield-orientation conveniently. It will be appreciated that such bubble dissipation removes a common cause of "dropouts", and other plating discontinuities, along wire W, since an agglomeration of such hydrogen bubbles can position itself adjacent wire W and shield the wire substrate from proper deposition of copper.

According to yet another feature of this novel cell arrangement, plating cell 1 also includes a pair of ionizing copper anodes 25, 25′, one being provided adjacent each conduit (21, 21′, respectively) being introduced therethrough and arranged to advantageously provide a highly uniform distribution of charged ions in the injected plating fluid and thus along the length of wire W within cell 1. It will be recognized that the function of anodes 25, 25′ is to ionizingly charge ionic particles in the plating fluid being introduced therepast, these particles being transported to the vicinity of wire W by the circulating fluid to thus establish a plating current between the anodes and wire W. Anodes 25 will be constructed to comprise conventional plating electrodes known to the art, being preferably made of highly conductive copper, shaped relatively rectangularly and spaced not so far from wire W as to introduce any appreciable resistance losses therebetween. The mass of the anode should, of course, be sufficient to provide long life since it will be somewhat dissolved by the plating. Anodes 25 may alternatively be positioned anywhere enabling them to so intercept injected plating fluid as to maintain a relatively uniform charge density along wire W (especially in regions L, 19, 19′). The position of the anodes will provide this uniformity, preferably providing one anode to charge the fluid emerging from each injection point (21, etc.) as shown, or the equivalent. This position is not directly related to the location of wire W since, in the described "dynamic" plating, no field effects are involved (unlike static "capacitive" plating).

Anodes 25, 25′ are charged at a suitable positive DC potential relative to wire W, preferably each being charged at the same potential. For example, anodes 25, 25′ have been charged from a plus 15-volt DC source which was regulated to provide a prescribed amount of plating current at wire W; for instance, providing about +12 volts at 400 ma. plating current; wire W being charge at close to ground (about plus 0.8 volt DC). As with the novel helical agitation arrangement, this arrangement of anodes for providing a uniform distribution of charged ions adjacent wire W, improves the uniformity of the plating rate along W, thus improving the smoothness and crystalline homogeneity of the plated copper deposit. As will be understood by those skilled in the art, such an arrangement also permits operation with very high plating current densities and thus higher plating rates and much greater plating thicknesses than heretofore known in the art.

The above copper plating features are unique in the art; for instance, providing a higher plating efficiency for coating magnetic substrates smoothly than known heretofore and providing much closer control over the roughness and crystallinity of a plated copper coating. Roughness control is vitally important in plating the described type of substrates for thin magnetic films, which may, for instance, rather critically require a (substrate surface) uniform roughness of between about #2 to #20 (STM). The invention can uniquely control roughness per se (i.e. keeping other characteristics constant), simply by increasing cyanide concentration or by reducing current density ("dual control"). Such roughness control can greatly simplify any subsequent polishing steps (such as those below) and, at times, make polishing feasible where before it was not. Of course, in the above examples, one may use commonly known leveling additives, such as "UBAC" (Udylite Corporation trade name) to maximize smoothness, e.g. to less than 1 micro-inch surface roughness. It might be noted here that the desired 1 to 4-micron uniform grain size (avg. diameter) usually corresponds to a surface roughness on the order of #4 to #8 STM, although it might also fall outside this range since the correspondence is only approximate (and in some cases a change in grain size may or may not result in a change in STM roughness). In any event the grain size measurement is a much more accurate indication (than the STM roughness number); especially for predicting magnetic properties of a film plated on the substrate. Prior art plated wire substrates, as workers in the art well know, typically exhibit virtually no grain at all (or, equivalently, have an ultra-fine grain), rather comprising a mirror surface (often corresponding to an STM roughness of approximately 0.1 to 1.0).

The foregoing preferred techniques for plating a copper substrate surface will be recognized as providing an improved cell structure and plating methods which are new in the art. The embodiments described showed them useful for plating a substantial thickness of copper onto a (beryllium copper) wire substrate subsequent to providing a relatively smooth, homogeneous surface thereon, this copper coating preferably exhibiting an improved "caviar" substrate surface on which thin magnetic films may be advantageously deposited. While the novel copper plating can provide control over surface uniformity and roughness, a finer control will at times be employed, supplementarily in the form of a post-polish. Of course, it will be apparent that other equivalent substrate treatments can yield like results. For example, workers in the art will appreciate that in certain cases a copper substrate surface (whether plated or not) may be "etched", or otherwise, cut into, in a controllable manner to render the aforedescribed "caviar" spherular roughness characteristic. However, we have confined our description to the foregoing preferred technique for electroplating this roughness characteristic, it being the one that appears most practical. There are also reasons for expecting that these, or similar, plating techniques may be useful for so depositing other metals or alloys; however, it is difficult to find a full substitute for copper having the same fast, efficient manner of deposition, the same chemical affinities in the (magnetic) super film electrolyte and the same precisely-controllable grain structure.

ELECTRO-POLISHING

Subsequent to the foregoing copper deposition, it is preferred to electro-polish the coated (rebuilt) wire, also continuously, since the coating may not be smooth enough for certain applications, such as having spherules, not quite as smooth, regular or homogeneous as desired for receiving thin magnetic films. It is especially preferred to electro-polish with a novel sulfamic acid bath, particularly when the wire is to be used as a substrate in a following sulfamate type magnetic plating solution. The current density will be varied according to the amount of polishing desired.

The copper-plated wire is therefore next continually advanced out of the coppering station, through a clean water rinse, and into an electro-polishing station, where the copper finish may be finally smoothed and also be sensitized for subsequent magnetic plating. The electro-polish is performed by a smoothing electrolysis using an aqueous phosphoric acid/sulfamic acid bath, such as indicated in Examples II, III or IV below. A sulfamic electro-polish bath is provided according to the invention to polish both smoothly and efficiently, while also reducing contamination of the substrate and dropouts during subsequent plating. For instance, eliminating the sulfamic acid constituent (in the presence of water) from a phosphoric acid bath has been found to induce the formation of oxidation sites which can block subsequent plating. Similarly, using sulfuric acid alone corrodes the copper layer catastrophically, leaving intolerable discontinuities therein. Orthophosphoric acid/sulfamic acid baths act to reduce the activity of the polishing bath and inhibit post-copper-plating oxidation (which degrades subsequent magnetic plating) and thus provide the best control over a "plate-able" surface finish at a minimum loss of plated copper thickness. For instance, they can produce a reproducible surface-leveling of from 1 to 300 micro-inch RMS for "drop-out-free" magnetic plating. The preferred electro-polishing conditions are indicated for Examples II, III, IV below, wherein it will be presumed that the above-mentioned "on-line" wire treating conditions apply (such as advancing the wire at five inches per minute) and wherein the cell used is understood to include a cylindrical lead polishing cathode as known in the art.

| Examples | II | III (pref.) | IV | Range |
|---|---|---|---|---|
| Bath: | | | | |
| Orthophosphoric acid | 100 | [1] 300 | 400 | 200-400 ml. |
| Water | 300 | 0–100 | 100 | 0-300 ml. |
| Sulfamic acid | [2] 1–15 | [3] 1–10 | [4] 1–5 | 1–15 gm. (pref. 2-6 gm.) (under about 5 gm./l. water). |

[1] Minimum 75%.
[2] Preferred 6.
[3] Preferred 4.
[4] Preferred 2.
NOTE.—Bath at room temperature. Current density-time immersed 2–50 ma./cm.$^2$ (pref. 12) for 50 sec. at 5"/min. (30 sec. at 9"/min.)

Sulfamic acid may be used up to the solubility limit of concentration to maintain smoothness, but a maximum of about 20 gm. sulfamic acid per liter water is preferred.

The above polishing steps have achieved a surprising smoothness when used with the copper-plated wire aforementioned, reducing roughness a predetermined controlled amount; for instance, from #40 (STM smoothness; micro-inches, peak-to-peak) to as little as #1. Any desired smoothness on the order of up to 3% of a typical plated thickness (about one micron) has been achieved. For instance, with Example IV above, a current density of 50 ma./cm.$^2$ will level a 4-micron copper coating on 5 to 8-mil wire to about #4 STM roughness, reducing wire thickness only about 1-micron. Conversely, at 1–5 ma./cm.$^2$, one may micro-polish the surface (i.e. level it) or brighten it (brightening is a lower-order, finer, polishing than levelling and may, or may not, accompany it), without affecting the overall microscopic surface roughness. The acid concentration and other polishing conditions may be varied as understood by those skilled in the art. This electro-polishing step may also be applied to metallic (coatings) substrates other than those from the copper family (i.e. copper alloys, silver alloys, etc.); though it appears unsuitable for such metals as nickel, iron or their alloys.

The formed, copper-plated, electro-polished wire is now ready for use and, for instance, may be continually advanced further, through a following clean water rinse and thence to a magnetic plating station for depositing a thin magnetic film a few microns thick, e.g. electroplating a nickel-iron magnetic film for plated wire memory application.

It will be apparent to those skilled in the art that the principles of the present invention may be applied to embodiments other than those described; for instance, using other techniques for rendering a magnetic film having a spherular ("caviar") configuration. While in acordance with the provisions of the statutes, there has been illustrated and described the best form of the invention known, it will be apparent to those skilled in the art that changes may be made in the form of the apparatus and the material, as well as the method steps here disclosed without departing from the spirit of the invention as set forth in the appended claims and that, in some cases, certain features of the invention may be used to advantage without a corresponding use of other features.

For instance, the inner (core) cylindrical substrate need not simply comprise the drawn (polished) Be-Cu copper-plated wire described, but may additionally include one or more layers of deposited material, such as material with dielectric, conductive or adhesive properties, etc. Of course, the outermost of these layers must be suitable to receive the "spherular" treatment. Besides the electroplated copper described such a layer might comprise any other non-magnetic (non-ferromagnetic) metal such as nickel, gold or the like, deposited (e.g. electrolessly) and surface-treated to assume the described spherular configuration according to the invention.

The spherular surface configuration provided on a plated wire substrate as described above, and the corresponding surface configuration of the metal film plated thereon, in accordance with this invention can be termed to consist of hemispherical protrusions of microscopic size, with the term "microscopic" being used in the sense of not being visible to the unaided eye. Further, the provision of such a surface in accordance with the invention can be termed a "texturing" process. The claims appended to this specification characterize this invention with the terms "microscopic," "hemispherical protrusions" and "texturing" in this context.

Having now described the invention, what is claimed as new and for which it is desired to secure Letters Patent is:

1. In the manufacture of a plated-wire memory element having a tubular information-storing magnetic film covering a rod-like nonmagnetic metallic substrate, the steps of (A) texturing the tubular outer surface of said substrate to produce a uniform distribution of substantially contiguous and uniformly-sized microscopic hemispherical protrusions, and (B) depositing said magnetic film onto said substrate surface with a substantially uniform thickness.

2. The method defined in claim 1 further characterized in that said roughening step produces said protrusions with a diameter larger than 0.3 micron and less than 20 microns.

3. The method defined in claim 1 further characterized in that said roughening step produces said protrusions with a diameter selected from the range of 0.5 micron to 10.0 microns.

4. The method defined in claim 1 further characterized in that said roughening step produces said protrusions with a diameter selected from the range of 1.0 micron to 4.0 microns.

5. The method defined in claim 1 further characterized in that said roughening step produces said protrusions to have a caviar appearance at 400× magnification.

6. The method defined in claim 1 further characterized in that said depositing step provides a nickel-iron alloy magnetic memory film on said substrate with a uniform thickness of about one micron.

7. The method defined in claim 1 in which said texturing is provided by electrodepositing copper with said hemispherical configuration onto a metallic strand.

8. The method defined in claim 7 further characterized in that said electro-deposition coats the entire surface of said strand to provide said substrate with said surface free of voids in said electrodeposited copper.

9. The method defined in claim 7 in which said copper is deposited with said protrusions by moving said strand through a plating cell, and by directing a flow of ionized copper-plating electrolyte in said cell against and along said strand.

10. The method defined in claim 9 in which said copper is deposited with said protrusions from said electrolyte at a current density between 50 and 600 milliamperes per square centimeter.

11. The process of preparing a rod-like, nonmagnetic electrically-conductive substrate for subsequent coating with a tubular, information-storing magnetic film, said process comprising the steps of (A) continually moving a rod-like, nonmagnetic, electrically-conductive strand through a copper-electroplating cell, (B) providing an aqueous copper-plating electrolyte in said cell having, for one liter of water, in the order of 60 grams of copper cyanide and 90 grams of sodium cyanide to have a concentration of free cyadine of 17 (±2) grams per liter and a concentration of copper of 40 (±5) grams per liter, and in the order of 30 grams of sodium carbonate and 20 grams of sodium hydroxide, and having a pH over 13 and a temperature around 40 to 60 degrees centigrade.

(C) directing a flow of said electrolyte in said cell against and along said strand, and (D) plating textured copper onto said strand from said flow of electrolyte, at a current density of about 50 to 600 milliamperes per square centimeter, and with a uniform thickness selected from the range of about one to six microns, said textured plating providing a surface configuration characterized by a uniform distribution of contiguous hemispherical protrusions of uniform size.

References Cited

UNITED STATES PATENTS

| | | | |
|---|---|---|---|
| 2,695,269 | 11/1954 | De Witz et al. | 204—206 |
| 3,330,631 | 7/1967 | Tsu | 204—40 |

OTHER REFERENCES

Young et al.: A Study of Cyanide Copper Plating Baths, Metal Industry, December 1938, pp. 560–562.

JOHN H. MACK, Primary Examiner
T. TUFARIELLO, Assistant Examiner

U.S. Cl. X.R.

29—196.3; 204—29, 40, 43, 52, 206